Patented Mar. 17, 1925.

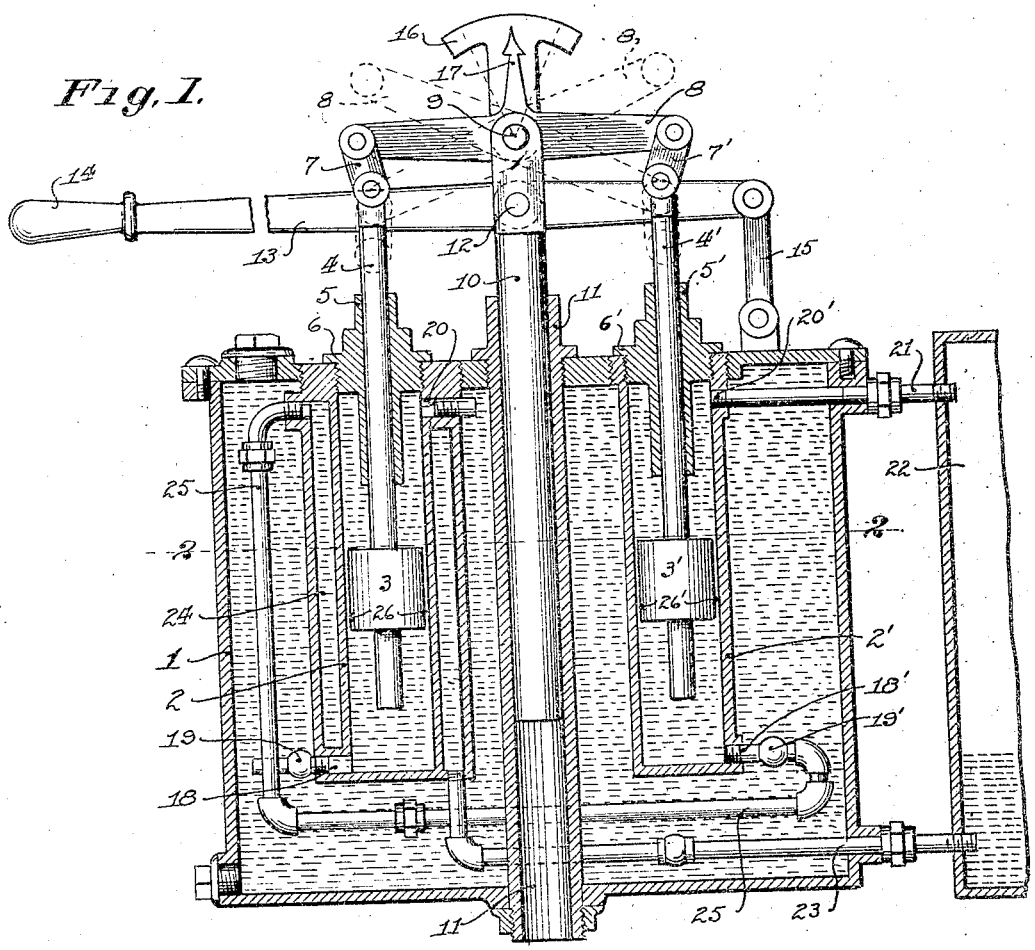

UNITED STATES PATENT OFFICE.

LESLIE R. PRIEST, OF OAKLAND, CALIFORNIA.

VISCOSITY COMPARATOR.

Application filed April 21, 1923. Serial No. 633,749.

*To all whom it may concern:*

Be it known that I, LESLIE R. PRIEST, a citizen of the United States, residing at Oakland, in the county of Alameda and State of California, have invented certain new and useful Improvements in Viscosity Comparators, of which the following is a specification.

My invention relates to means for indicating the difference between the viscosities of two liquids, one of which may be taken as a standard.

The object of my invention is to provide a simple and easily operated device for comparing the viscosity of a liquid with that of a known or standard liquid, within reasonable limits of accuracy. My invention may be embodied in a small self-contained apparatus which can be made in portable form or attached to any machine or apparatus in which is employed a liquid whose viscosity it is desirable to measure by comparison with a known or standard liquid. One such use of my invention is to measure in this manner the viscosity of the lubricating oil of internal combustion engines. Such oil when carried in the engine crank-case and continuously circulated, as is the common practise in automobile and airplane engines, is subject to dilution by unburned fuel which leaks past the pistons, and such dilution, if continued, will eventually render the oil unfit for the required lubrication of the engine. By means of a device embodying my invention secured in any convenient position upon the automobile or airplane, the amount of such dilution may be readily determined. Other uses of my invention will naturally suggest themselves to those skilled in the art.

A further object of my invention is to provide an apparatus for the purpose described which is of sufficiently rugged construction to enable successful operation by persons not skilled in the use of laboratory equipment, and under conditions which would preclude the use of the usual laboratory methods for determining viscosity. It is also an object of my invention to provide means for equalizing the temperatures of the standard liquid and the liquid under test, such equality of temperature being necessary for a true comparison of the viscosities of the two liquids.

With these objects in view my invention will now be described with reference to the accompanying drawings, it being understood that the form and construction of the device as described and illustrated is only one embodiment of the invention, and that such form and construction may be varied, to suit the practical requirements of the particular use to which the device is to be put, without departing from the essential principles of the invention as set forth in the claims hereto appended.

Referring to the accompanying drawings:—

Fig. 1 is a vertical section of a preferred embodiment of my invention, taken on the line 1—1 of Fig. 2.

Fig. 2 is a horizontal section taken on the line 2—2 of Fig. 1.

In the drawings, the reference numeral 1 designates a reservoir adapted to contain a supply of the standard liquid with which the liquid of unknown viscosity is to be compared. Within said reservoir are a pair of cylinders 2 and 2', of identical interior dimensions, in which are pistons 3 and 3' respectively, said pistons also being identical, both in length and diameter. The pistons 3 and 3' are fixed upon rods 4 and 4' respectively, which pass through guides 5 and 5' carried by the upper heads 6 and 6' of the cylinders, and are connected by the respective links 7 and 7' with the opposite ends of a horizontal lever 8. Said lever is pivotally mounted at 9 upon the upper end of a guide rod 10, which is mounted for vertical reciprocative movement in a guide 11 extending through the reservoir 1.

The guide rod 10 is pivotally connected at 12 with a lever 13, having a handle 14 at one end and at the other end a fulcrum comprising a link 15 pivotally connecting said lever with the reservoir 1. Thus by moving the hand lever 13 up and down, the guide rod 10, the horizontal lever 8, and the pistons 3 and 3' are all caused to move up and down together. The guide rod 10 carries a quadrant 16, upon which may be inscribed any suitable scale, not shown, adapted to be traveled over by a pointer 17 fixed to the lever 8 for indicating the angular position of said lever with respect to its normal or horizontal position.

The cylinder 2 has an inlet 18 at its lower end, equipped with a check valve 19, and an outlet 20 at its upper end, both said inlet and said outlet communicating with the interior of the reservoir 1. The cylinder 2' likewise has an inlet 18', provided with a check valve 19', at its lower end, and an outlet 20' at its upper end. Said outlet communicates, by a pipe 21, with the reservoir or other container 22 in which is the liquid to be tested. A pipe 23 connects said container 22 with the lower end of a jacket 24 surrounding the cylinder 2, and a pipe 25 connects the upper end of said jacket 24 with the inlet 18' of the cylinder 2'.

The pistons 3 and 3' are each provided with a by-pass which in its preferred form comprises a clearance, indicated at 26 and 26' respectively, between the peripheries of said pistons and the walls of their respective cylinders 2 and 2'. These by-passes, or clearances, have the same length and area, on account of the identical dimensions of the pistons 3 and 3' and the cylinders 2 and 2'. The piston rods 4 and 4' are preferably extended below the pistons 3 and 3', and are adapted to abut against the lower ends of the cylinders 2 and 2' to limit the downward movement of said pistons. Their upward movement is limited by contact with the lower ends of the guides 5 and 5', which are extended into the cylinders for this purpose.

When the pistons 3 and 3' are drawn upwardly, the standard liquid is drawn from the reservoir 1 into the lower portion of the cylinder 2 through the inlet 18, and the liquid to be tested is drawn into the lower portion of the cylinder 2' from the container 22 through the inlet 18', the pipes 25 and 23, and the jacket 24 surrounding the cylinder 2. At the same time any liquid which may have been in said cylinders above the pistons is forced out, the standard liquid flowing from the cylinder 2 into the reservoir 1 through the outlet 20, and the unknown liquid flowing from the cylinder 2' through the outlet 20' and the pipe 21 into the container 22. A certain amount of the liquid above the piston in each cylinder will be forced down past said piston, but on account of the relative restriction of the by-pass or clearance around said piston and the freedom of the inlet and outlet, the amount of liquid thus by-passed is relatively small compared with the amount drawn in through the inlet. In practise, several successive strokes of the pistons may be made, by means of the hand lever 13, to insure that the cylinders 2 and 2' are completely filled with their respective liquids to the exclusion of any possible entrapped air.

Under these conditions, when the pistons are forced downwardly, the liquids that are trapped within the cylinders 2 and 2' below said pistons by the check valves 19 and 19', are forced to flow through the restricted orifices formed by the clearances 26 and 26' between said pistons and the cylinder walls, and since these orifices or clearances are identical in both length and area, the relative rate of flow of the two liquids therethrough will depend upon the relative viscosity of said liquids, the pressure applied to said liquids by the pistons being equalized by the lever 8. The result is that the liquid having the lower viscosity, and therefore the higher rate of flow, will permit its piston to descend more rapidly than the other piston, and this difference in the rate of travel of the pistons causes the lever 8 to assume an inclined position, as shown by the dotted lines, in Fig. 1, such inclination being suitably indicated by the position of the pointer 17. Thus it will be seen that the position of the pointer 17 indicates the comparative viscosity of the two liquids, and that this indication is entirely independent of the pressure applied to the pistons, such pressure being applied equally to both pistons through the lever 8.

The temperatures of the two liquids within the cylinders 2 and 2' are equalized, thus removing this factor from the indication of their comparative viscosity. Such equalization of temperature is effected partly by having both cylinders immersed in the supply of standard liquid, partly by passing the unknown liquid through the jacket 26 around the standard liquid cylinder 2 before reaching its own cylinder 2', and finally by the form of the by-passes or orifices through which the liquids are forced while their rates of flow are being compared. These orifices, being in the form of the annular clearances 26 and 26' around the pistons 3 and 3', cause the liquids to spread out into thin films against the cylinder walls, so that their temperatures may be more readily equalized.

Frictional forces acting on the two pistons are also equalized. The piston rod guides 5 and 5' are identical in length and diameter, and the pistons themselves are prevented from rubbing against the cylinder walls partly by said guides and partly by the natural tendency of the liquids to form, under pressure, films of equal thickness throughout the entire circumferences of the annular by-passes 26 and 26'.

In adapting my invention for use upon an automobile or other similarly propelled vehicle, for determining the viscosity or degree of dilution of the engine crank-case oil, the reservoir 1 and its associated mechanism can be located in any convenient position, as, for example, upon the instrument or control board, and connected by suitable extensions of the pipes 21 and 23 with the oil reservoir or crank-case of the engine, which would correspond with the reservoir 22 described above.

It will be apparent to anyone skilled in the art that the device herein described and illustrated may be considerably modified in form and construction without departing from the essential principle of the invention, which resides in the provision of a pair of orifices of known relative areas, through which the two liquids are respectively forced, and means for indicating the viscosity differential between said liquids as determined by their relative pressures and rates of flow. In the specific embodiment of the invention herein illustrated, and described, the orifices are the by-passes or clearances 26 and 26' around the pistons 3 and 3', and said pistons, together with their rods 4 and 4', the connecting lever 8, and the pointer 17, constitute the means for indicating the viscosity differential of the liquids flowing through said orifices. In this case the ratio between the pressures of the liquids is unity, the viscosity differential being indicated by the comparative rates of flow, but as these factors are mutually dependent, they must both be considered as entering into the result. The ratio between the areas of the orifices, which in the specific case described is unity, also enters into the result, and must therefore be a known quantity.

I claim:—

1. A viscosity comparator comprising a pair of receptacles respectively adapted to receive and contain a supply of standard liquid and a supply of the liquid to be compared therewith, each receptacle having associated therewith an orifice through which the liquid contained therein may flow, the areas of said orifices bearing a known relation to each other; means for producing pressure in the liquids contained within said receptacles to cause said liquids to flow through said orifices; a connection between the pressure producing means of the two receptacles to cause the pressures of the two liquids to bear a known relation to each other; and means for indicating the viscosity differential between said liquids as determined by their comparative rates of flow through said orifices.

2. A viscosity comparator comprising a pair of receptacles respectively adapted to receive and contain a supply of standard liquid and a supply of the liquid to be compared therewith, each receptacle having associated therewith an orifice through which the liquid contained therein may flow, the areas of said orifices bearing a known relation to each other; a movable member within each receptacle, said members being adapted to produce pressure in the liquids contained within said receptacles to cause said liquids to flow through said orifices; a connection between said members to cause the pressures of the liquids in the two receptacles to bear a known relation to each other and means for indicating the viscosity differential between said liquids as determined by their comparative rates of flow through said orifices.

3. A viscosity comparator comprising a pair of receptacles respectively adapted to receive and contain a supply of standard liquid and a supply of the liquid to be compared therewith, each receptacle having associated therewith an orifice through which the liquid contained therein may flow, the areas of said orifices bearing a known relation to each other; connected means for producing equal pressures in the liquids in the two receptacles to cause said liquids to flow through their respective orifices; and means for indicating the comparative rates of flow of said liquids through said orifices.

4. A viscosity comparator comprising a pair of receptacles respectively adapted to receive and contain a supply of standard liquid and a supply of the liquid to be compared therewith, each receptacle having associated therewith an orifice through which the liquid contained therein may flow, the areas of said orifices bearing a known relation to each other; a movable member within each receptacle, said members being adapted to produce pressure in the liquids contained within said receptacles to cause said liquids to flow through their respective orifices; an exterior connection between said members to cause equal pressures to be produced in the two liquids; and means for indicating the comparative rates of flow of said liquids through said orifices.

5. A viscosity comparator comprising a reservoir adapted to hold a supply of one of the liquids to be compared; a pair of receptacles within said reservoir respectively adapted to receive and contain a portion of the liquid held by said reservoir and a supply of the liquid to be compared therewith, each receptacle having associated therewith an orifice through which the liquid contained therein may flow, the areas of said orifices bearing a known relation to each other; means for causing the liquids contained within said receptacles to flow through said orifices; and means for indicating the viscosity differential between said liquids as determined by their comparative pressures and their comparative rates of flow through said orifices.

6. A viscosity comparator comprising a pair of receptacles respectively adapted to receive and contain a supply of standard liquid and a supply of the liquid to be compared therewith, each receptacle having associated therewith an orifice through which the liquid contained therein may flow, the areas of said orifices bearing a known relation to each other; a jacket surrounding one of said receptacles; a connection between said jacket and the other receptacle whereby the liquid received by said other receptacle is first passed through said jacket; means for causing the liquids contained within said receptacles to flow through said orifices;

and means for indicating the viscosity differential between said liquids as determined by their comparative pressures and their comparative rates of flow through said orifices.

7. A viscosity comparator comprising a reservoir adapted to hold a supply of one of the liquids to be compared; a pair of receptacles within said reservoir respectively adapted to receive and contain a portion of the liquid held by said reservoir and a supply of the liquid to be compared therewith, each receptacle having associated therewith an orifice through which the liquid contained therein may flow, the areas of said orifices bearing a known relation to each other; a jacket surrounding one of said receptacles; a connection between said jacket and the other receptacle whereby the liquid received by said other receptacle is first passed through said jacket; means for causing the liquids contained within said receptacles to flow through said orifices; and means for indicating the viscosity differential between said liquids as determined by their comparative pressures and their comparative rates of flow through said orifices.

8. A viscosity comparator comprising a pair of identical cylinders for respectively holding the standard liquid and the liquid to be compared therewith; a piston operating in each cylinder and adapted for equal passage capacity for each liquid; and means for imposing equal pressure upon the two pistons, adapted for a difference in their respective rates of travel due to the viscosity differential between the two liquids.

9. A viscosity comparator comprising a pair of identical cylinders for respectively holding the standard liquid and the liquid to be compared therewith; means for establishing and maintaining temperature equality between the two liquids; a piston operating in each cylinder and adapted for equal passage capacity for each liquid; and means for imposing equal pressure upon the two pistons, adapted for a difference in their respective rates of travel due to the viscosity differential between the two liquids.

10. A viscosity comparator comprising a pair of identical cylinders for respectively holding the standard liquid and the liquid to be compared therewith; a piston operating in each cylinder and adapted for equal passage capacity for each liquid; means for imposing equal pressure upon the two pistons, adapted for a difference in their respective rates of travel due to the viscosity differential between the two liquids; and means for indicating the difference between the respective rates of said piston travel.

11. A viscosity comparator comprising a pair of identical cylinders for respectively holding the standard liquid and the liquid to be compared therewith; a piston operating in each cylinder, and fitted therein with an identical peripheral clearance for the passage of the respective liquids; and means for imposing equal pressure upon the two pistons adapted for a difference in their respective rates of travel due to the viscosity differential between the two liquids.

12. A viscosity comparator comprising a pair of identical cylinders for respectively holding the standard liquid and the liquid to be compared therewith; a jacket common to said pair of cylinders for containing a temperature equalizing medium; a piston operating in each cylinder and adapted for equal passage capacity for each liquid; and means for imposing equal pressure upon the two pistons, adapted for a difference in their respective rates of travel due to the viscosity differential between the two liquids.

13. A viscosity comparator comprising a reservoir adapted to contain a supply of one of the liquids to be compared; a pair of identical cylinders for respectively receiving and holding a portion of the liquid contained within said reservoir and a supply of the liquid to be compared therewith; a piston operating in each cylinder and adapted for equal passage capacity for each liquid; and means for imposing equal pressure upon the two pistons, adapted for a difference in their respective rates of travel due to the viscosity differential between the two liquids.

14. A viscosity comparator comprising a pair of identical cylinders for respectively receiving and holding the liquids to be compared; a jacket surrounding one of said cylinders; a connection between said jacket and the other cylinder whereby the liquid received by said other cylinder is first passed through said jacket; a piston operating in each cylinder and adapted for equal passage capacity for each liquid; and means for imposing equal pressure upon the two pistons, adapted for a difference in their respective rates of travel due to the viscosity differential between the two liquids.

15. A viscosity comparator comprising a reservoir adapted to contain a supply of one of the liquids to be compared; a pair of identical cylinders for respectively receiving and holding a portion of the liquid contained within said reservoir and a supply of the liquid to be compared therewith; a jacket surrounding one of said cylinders; a connection between said jacket and the other cylinder whereby the liquid received by said other cylinder is first passed through said jacket; a piston operating in each cylinder and adapted for equal passage capacity for each liquid; and means for imposing equal pressure upon the two pistons, adapted for a difference in their respective rates of travel due to the viscosity differential between the two liquids.

16. A viscosity comparator comprising a pair of independent, identical cylinders for respectively holding the standard liquid and the liquid to be compared therewith; a piston operating in each cylinder and adapted for equal passage capacity for each liquid; a lever having its ends respectively connected with the pistons; and means for applying pressure centrally to said lever.

17. A viscosity comparator comprising a pair of independent, identical cylinders for respectively holding the standard liquid and the liquid to be compared therewith; a piston operating in each cylinder and adapted for equal passage capacity for each liquid; a lever having its ends respectively connected with the pistons; means for applying pressure centrally to said lever; and an indicator associated with said lever for denoting its angularity due to the viscosity differential between the two liquids.

In testimony whereof I have signed my name to this specification.

LESLIE R. PRIEST.